United States Patent
Jones

(10) Patent No.: US 10,960,943 B2
(45) Date of Patent: Mar. 30, 2021

(54) UPPER COUPLER ASSEMBLY FOR TRAILERS

(71) Applicant: John M. Jones, Pooler, GA (US)

(72) Inventor: John M. Jones, Pooler, GA (US)

(73) Assignee: GREAT DANE LLC, Chicago, IL (US)

( * ) Notice: Subject to any disclaimer, the term of this patent is extended or adjusted under 35 U.S.C. 154(b) by 211 days.

(21) Appl. No.: 15/821,598

(22) Filed: Nov. 22, 2017

(65) Prior Publication Data
US 2019/0152546 A1  May 23, 2019

(51) Int. Cl.
*B62D 21/20* (2006.01)
*B62D 53/06* (2006.01)
*B62D 53/08* (2006.01)
*B62D 25/20* (2006.01)

(52) U.S. Cl.
CPC .......... *B62D 53/067* (2013.01); *B62D 21/20* (2013.01); *B62D 53/0842* (2013.01); *B62D 25/209* (2013.01); *B62D 53/061* (2013.01)

(58) Field of Classification Search
CPC ...... B62D 53/067; B62D 21/20; B62D 53/08; B62D 5321/09; B62D 25/209
See application file for complete search history.

(56) References Cited

U.S. PATENT DOCUMENTS

| | | | | |
|---|---|---|---|---|
| 2,812,192 A | * | 11/1957 | Cole | A62B 18/00 280/789 |
| 3,612,569 A | * | 10/1971 | Marinelli | B62D 53/061 280/423.1 |
| 3,633,941 A | | 1/1972 | Pleier | |
| 3,770,296 A | * | 11/1973 | Logan | B62D 53/0842 280/407 |
| 3,771,816 A | * | 11/1973 | Hord, Jr. | B62D 53/0842 280/433 |
| 3,990,720 A | * | 11/1976 | Schwartz | B62D 53/06 280/433 |
| 4,946,184 A | * | 8/1990 | Larocco | B62D 53/0842 280/433 |
| 5,277,470 A | | 1/1994 | Freeman et al. | |
| 5,417,453 A | * | 5/1995 | Vandenberg | B62D 21/03 280/785 |
| 5,465,487 A | | 11/1995 | Dean | |
| 6,276,105 B1 | | 8/2001 | Wycech | |
| 6,406,048 B1 | | 6/2002 | Castellano | |

(Continued)

OTHER PUBLICATIONS

Canadian Office Action dated Dec. 19, 2019 for corresponding Canadian application No. 3,024,367.

(Continued)

*Primary Examiner* — Kevin Hurley
*Assistant Examiner* — Marlon A Arce
(74) *Attorney, Agent, or Firm* — Nelson Mullins Riley & Scarborough LLP

(57) ABSTRACT

An upper coupler for a semi-trailer has a generally planar bottom plate. A kingpin attaches thereto to couple with a fifth wheel of a tractor. A reinforcement member extends across a width of the bottom plate to reduce bending of the bottom plate as it rests on the fifth wheel of the tractor. Along the reinforcement member's length, the reinforcement member has varying second moments of area taken in cross sections perpendicular to the reinforcement member's length.

41 Claims, 7 Drawing Sheets

(56) References Cited

U.S. PATENT DOCUMENTS

| | | | | |
|---|---|---|---|---|
| 6,565,109 B1* | 5/2003 | Kloepfer | ................ | B62D 53/08 |
| | | | | 280/433 |
| 8,465,042 B2 | 6/2013 | Knollman | | |
| 8,485,544 B2 | 7/2013 | McNeil et al. | | |
| 9,834,264 B2* | 12/2017 | Wylezinski | ............ | B62D 53/06 |
| 2001/0028160 A1* | 10/2001 | Athans | ................... | B62D 53/06 |
| | | | | 280/433 |
| 2007/0069500 A1* | 3/2007 | Bloodworth | ....... | B62D 53/0842 |
| | | | | 280/433 |
| 2010/0264624 A1* | 10/2010 | McNeil | .............. | B62D 53/0842 |
| | | | | 280/433 |
| 2011/0089667 A1* | 4/2011 | Knollman | .......... | B62D 53/0842 |
| | | | | 280/433 |
| 2013/0069340 A1* | 3/2013 | Goedken | ............ | B62D 53/0842 |
| | | | | 280/433 |

OTHER PUBLICATIONS

Canadian Office Action dated Aug. 25, 2020 for corresponding Canadian application No. 3,024,367.

* cited by examiner

UPPER COUPLER ASSEMBLY FOR TRAILERS

FIELD OF THE INVENTION

Example embodiments generally relate to cargo carrying trailers and, in particular, to upper coupler assemblies for cargo carrying trailers.

BACKGROUND OF THE INVENTION

A wide variety of trailers are known for carrying cargo. Van type trailers, for example, typically include a deck assembly supported by a side wall structure, wheels, and retractable front legs. The deck assembly may include longitudinal floor boards and transverse cross-members, such as I-beams, extending between opposing bottom rails. The deck transfers its load to the bottom rails, wheels, and, depending upon whether or not the trailer is coupled to a tractor or is free-standing, to a tractor fifth wheel or to the retractable front legs on the trailer. Platform trailers, which have no box structure above the floor deck to support the load, often comprise a floor supported underneath by a pair of transversely spaced-apart, parallel, upwardly bowed I-beams extending longitudinally beneath the floor. Two or more wheeled rear axles transfer load from the beam to the wheels via a suspension between the axles and the floor and beams. The deck and beams transfer their load to a tractor fifth wheel via an upper coupler or to retractable front legs on the trailer, again depending upon whether the trailer is attached to a tractor or is free-standing.

A trailer typically couples with a tractor via a fifth wheel coupling that enables the trailer to pivot with respect to the tractor about a vertical axis. The fifth wheel coupling includes a horseshoe-shaped "fifth wheel" on the tractor that is typically greased so that a lower surface of the trailer's upper coupler slides against an upper surface of the fifth wheel. Referring to FIGS. 1-3, a conventional upper coupler assembly 1 for a van type trailer includes a rectangular bottom plate 2 that provides the lower surface against which the fifth wheel (not shown) of the tractor (not shown) slides. Rectangular bottom plate 2 extends in a dimension transverse to the trailer's longitudinal dimension between longitudinal members of a C-shaped attachment frame 3 that provides a structure for mounting upper coupler 1 to the trailer's frame structure. A kingpin 4 extends downward from bottom plate 2 and engages the tractor fifth wheel. A trapezoidal approach plate 5 attaches at a wide end to a transverse portion of C-shaped attachment frame 3 and at a narrow end to bottom plate 2. Both bottom plate 2 and approach plate 5 have a plurality of holes near C-shaped attachment frame 3 that provide, when the upper coupler is attached to the trailer, access to mounting hardware that attaches upper coupler 1 to the trailer. A pair of cross members 6, having consistent U-channel cross sections taken in planes perpendicular to their dimension of elongation, extend in the trailer's transverse dimension above bottom plate 2 with their respective channel openings facing downwards. Cross members 6 provide rigidity to resist bending of bottom plate 2 about an axis that extends through a center of bottom plate 2 in the trailer's longitudinal dimension as the fifth wheel applies an upward load to the bottom plate. Longitudinally-extending U-shaped channels 7 provide rigidity to approach plate 5 and have holes therethrough for allowing pneumatic tubing and electrical wires to pass therethrough.

SUMMARY OF THE INVENTION

The present invention recognizes the foregoing considerations, and others, of prior art construction and methods. Accordingly, respective objects of the present invention may include providing an improved trailer and an improved upper coupler for a trailer.

According to an example embodiment, a semi-trailer for use with a tractor includes a floor having a forward end and a rearward end and being elongated between the forward end and the rearward end, thereby defining a longitudinal axis extending between the forward end and the rearward end. Wheels are attached to the floor at a rearward section of the trailer proximate the rearward end by a suspension. An upper coupler assembly is attached to the floor at a forward section of the trailer proximate the forward end. The upper coupler assembly has a generally planar bottom plate having a lower surface that defines an area of contact between the upper coupler assembly and a tractor fifth wheel, a kingpin attached to the bottom plate and extending downward from the lower surface, and a first reinforcement member attached to an upper surface of the bottom plate that is elongated in a first direction parallel to an axis that is transverse to the longitudinal axis. The first reinforcement member has a second moment of area defined in cross section taken in a plane perpendicular to the first direction about a horizontal axis through a centroid of the cross section. The second moment of area of the first reinforcement member varies over at least part of the first reinforcement member in the first direction.

In a further example embodiment, a semi-trailer for use with a tractor has a floor having a forward end and a rearward end and being elongated between the forward end and the rearward end, thereby defining a longitudinal axis extending between the forward end and the rearward end. Wheels are attached to the floor at a rearward section of the trailer proximate the rearward end by a suspension. An upper coupler assembly is attached to the floor at a forward section of the trailer proximate the forward end. The upper coupler has a generally planar bottom plate having a lower surface that defines an area of contact between the upper coupler assembly and a tractor fifth wheel, a kingpin attached to the bottom plate and extending downward from the lower surface, and a first reinforcement member attached to an upper surface of the bottom plate that is elongated in a first direction parallel to an axis that is transverse to the longitudinal axis. The first reinforcement member has a length in a direction parallel to the longitudinal axis that varies in the first direction over at least a portion of the first reinforcement member.

A still further example embodiment is an upper coupler assembly that is disposed within a semi-trailer for use with a tractor. The semi-trailer has a floor having a forward end and a rearward end and being elongated between the forward end and the rearward end, thereby defining a longitudinal axis extending between the forward end and the rearward end. Wheels are attached to the floor at a rearward section of the trailer proximate the rearward end by a suspension, the upper coupler assembly being attached to the floor at a forward section of the trailer proximate the forward end. The upper coupler assembly has a generally planar bottom plate having a lower surface that defines an area of contact between the upper coupler assembly and a tractor fifth wheel. A kingpin is attached to the bottom plate and extending downward from the lower surface. A first reinforcement member is attached to an upper surface of the bottom plate that is elongated in a first direction parallel to an axis that is transverse to the longitudinal axis. The first reinforcement member has a second moment of area defined in cross section taken in a plane perpendicular to the first direction about a horizontal axis through a centroid of the cross section. The second moment of area of the first reinforcement member varies over at least part of the first reinforcement member in the first direction.

BRIEF DESCRIPTION OF THE DRAWINGS

A full and enabling disclosure of the present invention, including the best mode thereof, directed to one of ordinary skill in the art, is set forth in the specification, which makes reference to the appended drawings, in which.

Figure 1:
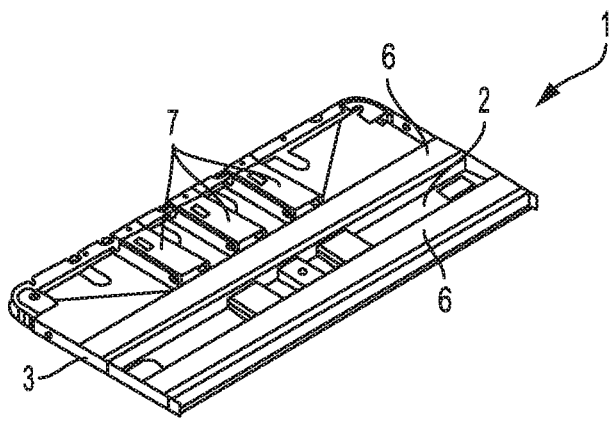
FIG. 1 is a perspective view of a top of an upper coupler according to the prior art.
Figure 2:
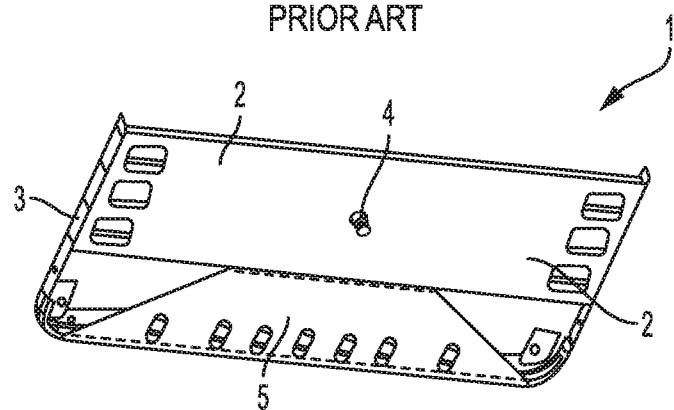
FIG. 2 is a perspective view of a bottom of the upper coupler of FIG. 1.

Repeat use of reference characters in the present specification and drawings is intended to represent same or analogous features or elements of the invention according to the disclosure.

DESCRIPTION OF THE PREFERRED EMBODIMENTS

Some example embodiments now will be described more fully hereinafter with reference to the accompanying drawings, in which some, but not all, example embodiments are shown. Indeed, the examples described and pictured herein should not be construed as being limiting as to the scope, applicability, or configuration of the present disclosure. Like reference numerals refer to like elements throughout. As used herein, "operable coupling" should be understood to relate to direct or indirect connection that, in either case, enables functional interconnection of components that are operably coupled to each other.

Figure 4:
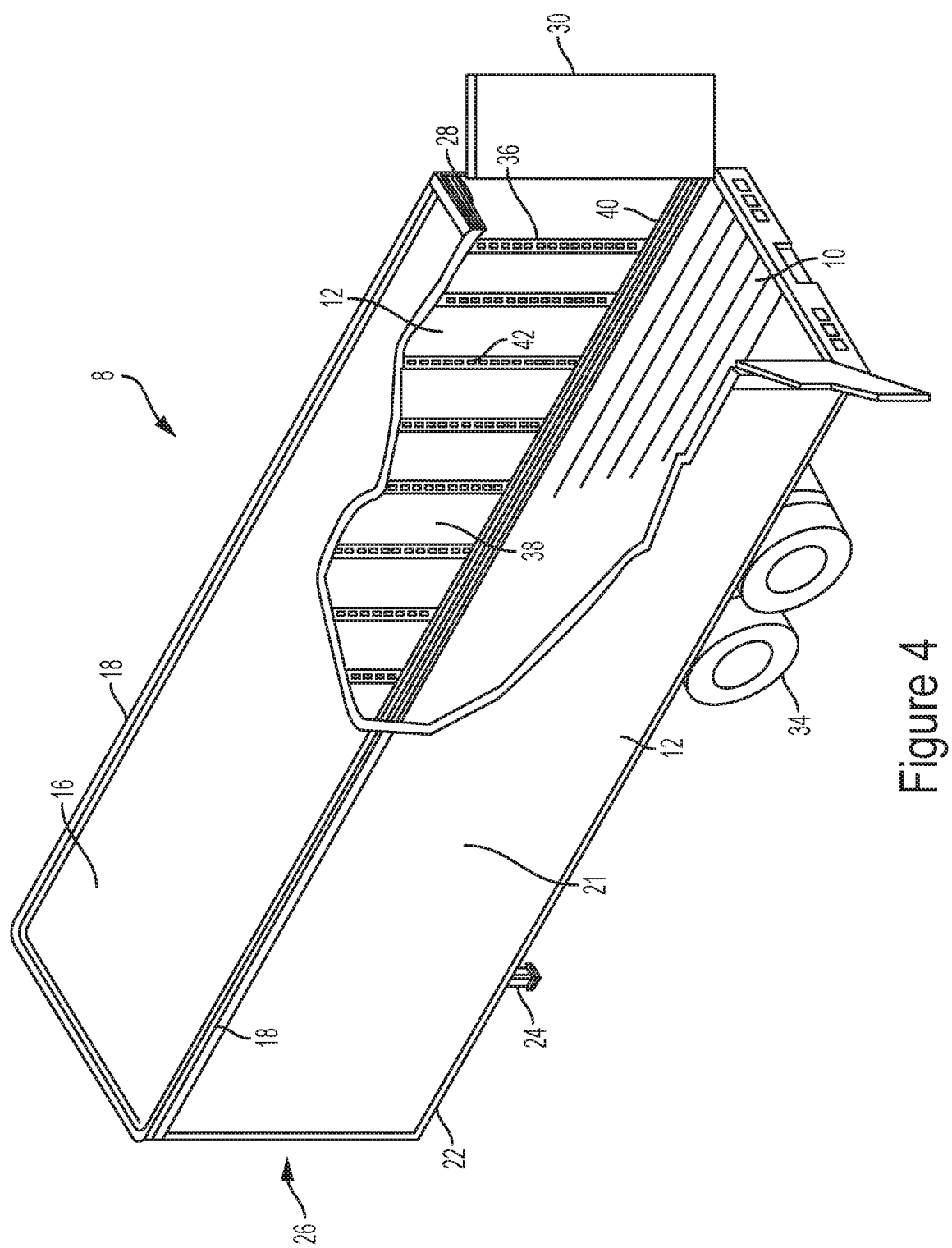
FIG. 4 is a perspective view of a semi-trailer according to an example embodiment.

As used herein, terms referring to a direction or a position relative to the orientation of a semi-trailer, such as but not limited to "vertical," "horizontal," "above," or "below," refer to directions and relative positions with respect to semi-trailer's orientation in its normal intended operation, as indicated in FIG. 4.

Further, the term "or" as used in this disclosure and the appended claims is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may.

FIG. 4 illustrates a trailer 8 having a floor 10, two side walls 12, and a roof 16. The two side walls 12 are identically constructed, though mirror images of each other. Roof 16 is attached to side walls 12 by top rails 18, and each side wall is connected to floor 10 by a respective bottom rail 22 (one of which is shown in FIG. 4). The trailer includes retractable legs 24, a forward end wall 26, and a rearward end frame 28. Once assembled, the roof, floor, and side walls form a trailer having a generally rectangular cross-section when viewed from the rear. The distance between inner surfaces of the two side walls 12 is generally greater than ninety inches, and the distance between outer side wall surfaces of is generally less than 110 inches. Although the examples illustrated herein are presented in terms of a sheet-and-post trailer, it should be understood that the present disclosure encompasses other types of trailer constructions, such as plate trailers and platform trailers.

A pair of doors 30 at the trailer's rearward end are pivotally connected to rear end frame 28, although the trailer may have a single roll-up door in other embodiments, as should be understood in this art. A plurality of wheels 34 support the trailer's rearward end and facilitate movement of the trailer when coupled to a tractor (not shown). Wheels 34 rotate with respect to a plurality of axles (not shown) that extend transverse to the trailer's dimension of greatest elongation, or longitudinal dimension, and transfer the load from the cargo, through the trailer's chassis, to the wheels. More specifically, the axles support a suspension system, for example an air ride suspension or a leaf spring system, that is attached to longitudinally extending slide rails upon which the suspension elements are adjustably attached and that attach to the floor's cross members so that load from the cargo interior transfers to the axles and the wheels from the axles' attachment to the cross members via the suspension. A front end of the semi-trailer includes an upper coupler, further discussed herein, that is configured to engage with a fifth wheel (not shown) of the tractor to thereby secure the trailer to the tractor so that the tractor may pull the trailer. The fifth wheel includes a flat plate that is typically greased so that a lower surface of the upper coupler slides against an upper surface of the fifth wheel. The fifth wheel coupling, in this instance a union between the semi-trailer's upper coupler and the tractor fifth wheel at the upper coupler's kingpin, enables the trailer to pivot with respect to the tractor about a vertical axis, while the fifth when itself is pivotable with respect to the tractor about a horizontal axis transverse to the tractor's longitudinal dimension so that, when the trailer is connected to the tractor at the fifth wheel, the trailer can pivot to a limited extend with respect to the trailer about that horizontal axis. The construction and operation of fifth wheels should be understood in this art and are, therefore, not discussed in further detail herein.

Figure 5:
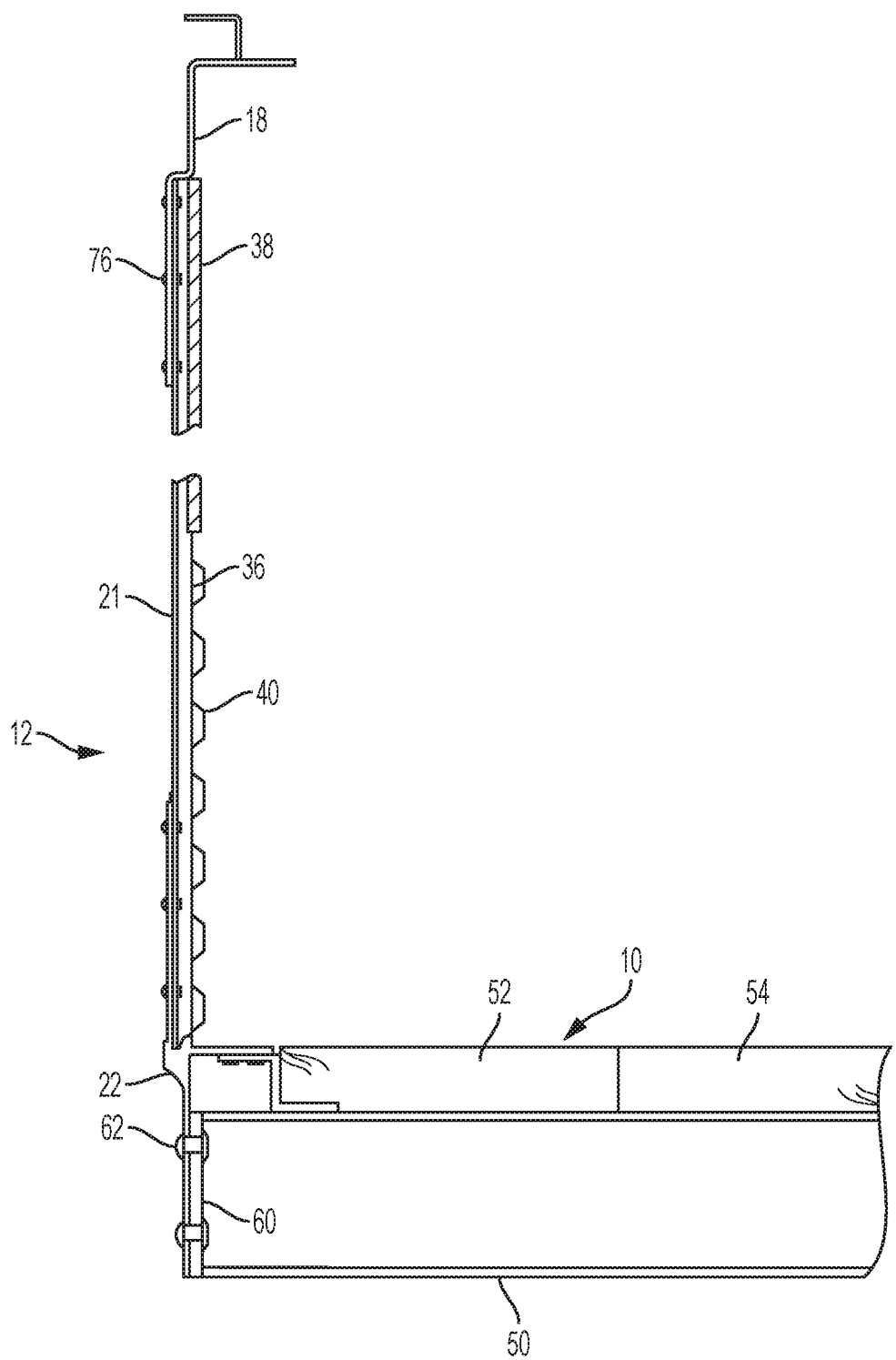
FIG. 5 is a cross-sectional view of the semi-trailer of FIG. 4, taken in a plane perpendicular to the semi-trailer's longitudinal dimension.

Referring also to FIG. 5, side wall 12 includes a plurality of vertical posts 36, a plurality of interior side wall liner panels 38, and one or more scuff bands 40. The liner panels interconnect the posts, and the scuff band is received within a recessed portion of a bottom portion of posts 36. Each post includes a longitudinal front face through which is defined a series of apertures 42 (FIG. 4) for receipt of cargo straps and the like to secure the trailer contents.

Panels 38 are fastened to posts 36 by screws, rivets, tapit pins, or any other suitable method. The panels are constructed of plywood or other suitable materials, for example steel or polymer. In an embodiment, the panels comprise corrugated metal panels including a plurality of recessed channels that give the panels added structural strength and stiffness.

Posts 36 are fastened to top rail 18 by suitable means such as rivets, screws or the like. Thus, the panels are secured to the top rail though their connection to the posts. An outer skin 21 is fastened to the trailer's top and bottom rails. The portion of the top rail to which the posts are fastened extends behind liner panels 38.

Figure 6:
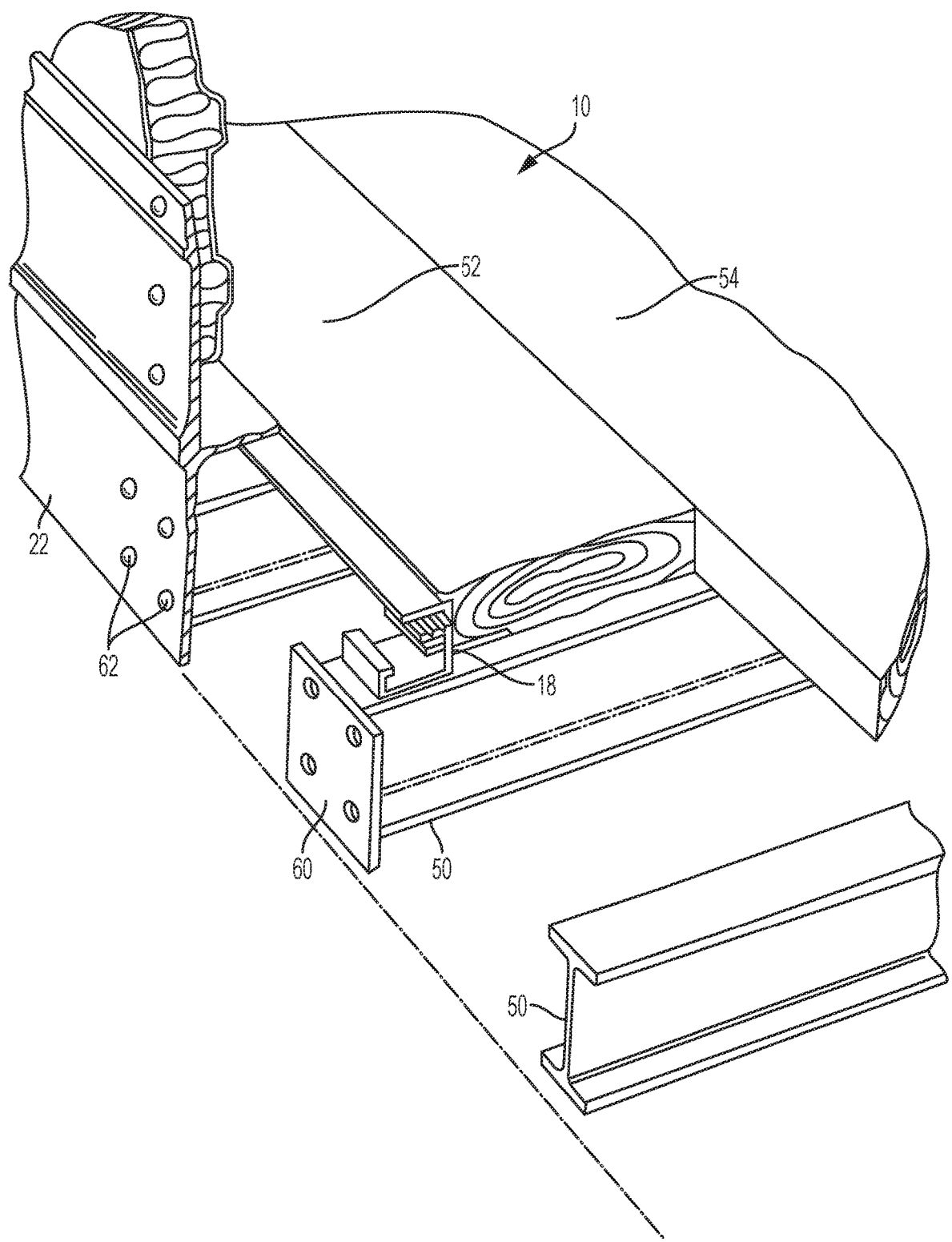
FIG. 6 is a partial perspective cut away view of the semi-trailer of FIG. 4.

As best seen in FIG. 6, the deck assembly includes a floor 10 and I-beam support members, also referred to as I-beams, 50 that extend transverse to the longitudinal dimension of the trailer and that are connected on both ends to respective trailer bottom rails 22 (one of which is shown in FIG. 6). The floor comprises a series of parallel longitudinal floorboards including an edge plank 52 on each side of the floor and inner planks 54 extending side-by-side across the trailer and secured to I-beam support members 50 by bolts or other materials and methods as should be understood in the art. Each I-beam 50 includes an end plate 60 welded to each end, and end plates 60 are fastened to a bottom portion of a bottom rail 22 via, for example, rivets 62. Floor 10, and the deck assembly, has a forward end at a rail at the bottom of forward end wall 26 (FIG. 4) and a rearward end at the bottom rail of rearward end frame 28 (FIG. 4). The floor's, and the deck assembly's, longest dimension is between the forward and rearward ends, defining a longitudinal floor/deck assembly axis extending between the forward and rearward ends and bisecting the floor.

Figure 7:
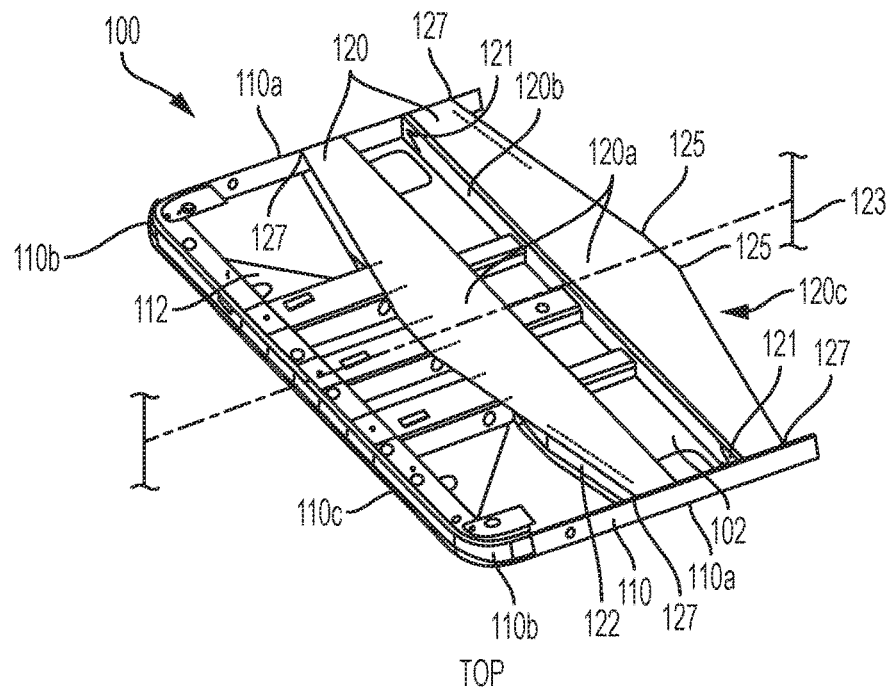
FIG. 7 is a top perspective view of an upper coupler according to an example embodiment for use with the trailer of FIG. 4.
Figure 8:
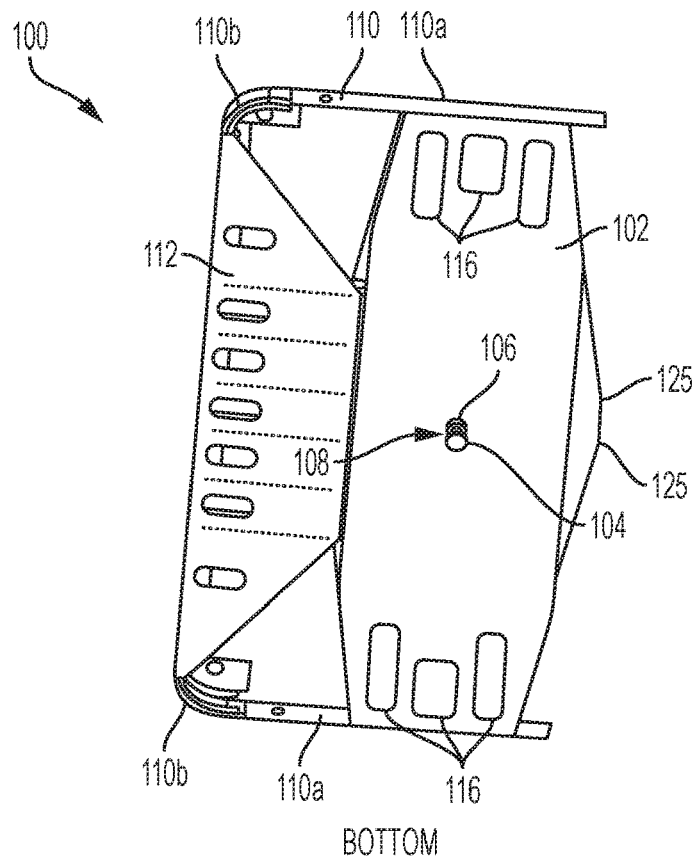
FIG. 8 is a bottom perspective view of the upper coupler of FIG. 7.

Referring to FIGS. 7 and 8, an upper coupler assembly 100 includes a generally planar bottom plate 102 that seats against the tractor's fifth wheel when the trailer couples to the tractor, so that the bottom plate's lower surface defines an area that engages the fifth wheel. A kingpin 104 extends through a through-hole in a center of bottom plate 102 and downward from the bottom plate lower surface to engage the fifth wheel of the tractor. Although not show in detail, a top of kingpin 104 includes an upper disk-shaped flange that extends radially from the elongated kingpin's axis (which extends perpendicularly with respect to the generally planar bottom surface of bottom plate 102), so that a lower surface of the upper flange abuts an upper surface of bottom plate 102. The upper flange of kingpin 104 attaches to bottom plate 102 by suitable means such as bolting or weldment. Kingpin 104 further includes a cylindrical neck 106 that extends below the upper flange and has a turned-down neck portion 108. Upon engagement with the tractor fifth wheel, a keeper on the tractor fifth wheel hooks about cylindrical neck 106 into turned-down neck portion 108. Turned down portion 108 is bounded by upper and lower ridges so that the keeper cannot slide from turned down portion 108 and release the kingpin. That is, portions of neck 106 above and below turned down portion 108 extend sufficiently from the kingpin's axis to retain the keeper in turned down portion 108 of kingpin 104.

Upper coupler assembly 100 includes a C-shaped frame 110 that has longitudinally extending (that have a longitudinal dimension in the trailer floor's longest, or longitudinal, dimension or axis, as discussed above) members 110a, arcuate corners 110b, and a member 110c extending in a direction transverse (e.g. perpendicular) to the floor's longitudinal axis so that member 110c defines a front of upper coupler 100. Upper coupler 100, having arcuate corners, matches the contour of the front of the trailer, and the upper coupler is disposed between bottom rails 22 (FIG. 4), adjacent a front scuff band (not shown, but wraps around the trailer's front between bottom rails 22) having matching arcuate corners, in front of a front-most support member 50 (FIG. 6) and beneath and adjacent floorboard planks 52, 54 (FIG. 6). Frame 110 attaches to bottom rails of the semi-trailer via rivets or other suitable attachment hardware so that transverse member 110c is disposed at a front of the trailer. In an embodiment, upper coupler 100 has a height of 4.25 inches from a top surface of its cross members, further discussed in detail herein, to the bottom surface of bottom plate 102.

A trapezoidal approach plate 112 attaches via weldment at a wide end to transverse member 110c and at a narrow, tapered end to bottom plate 102. Approach plate 112 provides a level surface to orient the fifth wheel as it engages with the upper coupler. In further embodiments, approach plate 112 is rectangular and extends an entire width of the upper coupler (i.e. between transverse members 110a).

Bottom plate 102 extends between, and attaches via weldment to, longitudinal members 110a. The bottom plate is a generally planar plate that is elongated in the trailer's (and floor's) transverse dimension and with tapered ends so that the plate is widest (wherein its width is defined in a direction parallel to the floor's longitudinal axis) at its center (including and extending transversely from a vertical plane that includes the floor longitudinal axis and passes through the kingpin) and narrowest at its ends that attach to frame 110. Ends of bottom plate 102 each include three holes 116 that provide access to fasteners for attaching longitudinal members 110a to respective bottom rails 22 (FIG. 4). Bottom plate 102 has a straight front edge that extends in the trailer's transverse dimension along the portion of its front edge where it mates with approach plate 112 and a similar straight transversely-extending rear edge so that the bottom plate is symmetrical about a vertical plane that bisects the bottom plate in the trailer's transverse dimension.

Upper coupler assembly 100 further includes a pair of cross members 120 that are spaced from each other in the trailer's longitudinal dimension and extend in their longest dimension transverse to the floor's longitudinal axis along an upper surface of bottom plate 102 between longitudinal members 110a. In one or more embodiments, each cross member 120 has an L-shaped cross section taken in a respective plane perpendicular to the trailer's/floor's transverse dimension, including a first leg 120a and a second leg 120b. Each second leg 120b extends vertically from bottom plate 102. Each first leg 120a extends horizontally from a top end of a respective second leg 120b, opposite the upper surface of bottom plate 102, at a ninety degree attachment from leg 102b and in a direction away from the other cross member 120. First legs 120a linearly taper from a portion of greatest length (wherein its length is defined in a direction parallel to the floor's longitudinal axis), at a vertical plane that includes the floor's longitudinal axis and passes through the kingpin, to narrowest portions at each end of the cross member adjacent longitudinal members 110a. Each of legs 120a and 120b is welded to longitudinal frame members 110a, and vertical leg 120b may be additionally welded to the upper surface of bottom plate 102. Cross members 120 are oriented so that an opening of a C-shaped channel formed by the two legs 120a and 120b, and the upper surface of bottom plate 102, of a forward cross member 120 faces the front of the trailer, and a corresponding opening defined by the rearward cross member 120 and the upper surface of bottom plate 102 faces the rear of the trailer. A pair of vertical reinforcement members 122 extend vertically between an upper surface of bottom plate 102 and a lower surface of each respective horizontal leg 102a. Vertical reinforcement members 122 each follow a profile of, but are slightly offset from, a respective proximate edge of the bottom plate. Vertical reinforcement members 122 attach via weldment to bottom plate 102 and respective first legs 102a. Accordingly, at each cross member, an upside-down U-shape construction is defined by the cross member in cross-section by each vertical second leg 120b and its corresponding horizontal first leg 120a and opposing vertical reinforcement member 122.

At each intersection between a second leg 120b and a longitudinal member 110a, a V-shaped reinforcing member is welded to second leg 120b. The thickness of the reinforcing member 121 (approximately 0.229" steel, nominal '0.25") is slightly greater than the thickness of second leg 120b (approximately 0.178" steel, nominal 0.1875"), thereby effectively more than doubling the thickness of second leg 120b at the weldment with the corresponding longitudinal member 110a. In a further embodiment, reinforcing member 121 is an L-shaped bracket welded to the interior surfaces of first leg 120a and second leg 120b at the edge of cross member 120 adjacent longitudinal member 110a, again providing an effective doubling (or more) of the thickness of cross member 120 at the weldment with the longitudinal member 110a (first leg 110a also has a thickness of about 0.178" steel).

In one or more other embodiments, cross members 120 have C-shaped cross-sections, rather than the L-shaped cross-sections of the embodiments discussed above, such that each cross member is comprised of a horizontal first leg 120a, vertical second leg 120b, as described above, but also with a third leg 120c (not shown but indicated in FIG. 7) that extends horizontally from the bottom of vertical second leg 120b, parallel to upper horizontal leg 120a. That is, while reference number 120c is indicated in FIG. 7, this relates to the embodiment in which the cross members 120 have a C-shaped cross-section, rather than an L-shaped cross-section. Third leg 120c sits flush against the upper surface of bottom plate 102, and it and vertical leg 120b may be adhesively bonded, welded, or attached by bolts or other fasteners to the bottom plate. In these and other embodiments as described herein, the various legs of the cross members may be discrete pieces attached to each other and/or directly to other components of the upper coupler assembly, or one or more legs may be integrally formed with each other and formed to the geometries disclosed herein by suitable machining. Each third leg 120c extends horizontally from a bottom end of each second leg 120b at a ninety degree bend and parallel to first leg 120a. Again, cross members 120 are oriented so that a forward cross member 120 has its C-channel opening facing the front of the trailer, and a rear cross member 120 has its C-channel opening facing the rear of the trailer. Reinforcement members 122 may be configured and attached to the cross members 120 in the C-shaped embodiments in a manner similar to that of the L-shaped embodiments, as described above. With their greater surface area contact between the cross members 120 and the upper surface of bottom plate 102, the C-shaped embodiments provide greater opportunity to secure the cross members to a steel bottom plate 102 by bonding, thereby facilitating the use of non-steel materials, such as aluminum, for the cross members, which may not be welded to the steel bottom plate.

Because, in some configurations, the upper coupler receives an upward force centered about kingpin 104 where the tractor fifth wheel supports the trailer, the upper coupler's bending moment (about a horizontal axis through the centroid of its cross section taken in a plane perpendicular to the trailer's transverse direction) is highest at its center and lower at its side edges. Bottom plate 102 is longer (considered as a length parallel to the floor's longitudinal axis) at locations subject to relatively higher bending moments and narrower at locations subject to relatively lower bending moment, thereby providing a plate with a relatively higher bending strength in areas subject to relatively higher bending moments and relatively lower bending strengths in locations subject to relatively lower bending moments. Similarly, in the prior art, transverse cross members had consistent cross sections taken in planes perpendicular to the trailer's transverse dimension. In contrast, first leg 120a of cross member 120 has a greater cross section length in the center of the trailer (in this example, in the vertical plane that includes the floor's longitudinal axis and the kingpin, as discussed above) than at the sides. Thus, cross member 120 has, in cross sections taken in planes perpendicular to the trailer's transverse dimension about horizontal axes through the cross sections' respective centroids, higher second moments of area where the cross member is subject to higher bending moments, near the center of the member in the transverse dimension, and lower second moments of area where the cross member is subject to lower bending moments, near the ends of the member. Thus, like bottom plate 102, the cross members have a relatively higher bending strength in locations subject to relatively higher bending moments and relatively lower bending strength in locations subject to relatively lower bending moments. In this way, as compared to cross members having consistent cross sections along their lengths and equal maximum stress due to bending under similar loading conditions, tapered cross members 120 weigh less. In contrast to the prior art that uses a bottom plate and cross members, each having constant cross sections taken in vertical planes that extend in the longitudinal dimension of the trailer, the bottom plate and cross members illustrated in FIGS. 7 and 8 have maximum cross sectional areas in locations subject to highest moments and lesser cross sectional areas in locations subject to lower bending moments. In this way, upper coupler 100 requires less structural material and, therefore, weighs less than upper couplers of the prior art without increasing a maximum stress in either the bottom plate or the cross members. In one or more embodiments, implementing tapered bottom plate 102 and tapered cross members 120 in upper coupler 100 reduces the upper coupler assembly's weight by 150 pounds from a similar upper coupler having a bottom plate and cross members with consistent cross sections taken in planes perpendicular to the trailer's transverse dimension.

As illustrated in FIGS. 7 and 8, the greatest dimension of the two horizontal first legs 120a, in a direction parallel to the trailer floor's longitudinal axis, is at the vertical plane 123 that includes the trailer floor's longitudinal axis and passes through the kingpin. Moving transversely (e.g. perpendicularly) away from each side of the vertical plane, this dimension, or length, remains constant for a short distance until reaching a position 125 on the horizontal leg at which the length begins to decline. In other embodiments, however, the length begins to immediately decline from the vertical plane, so that the two horizontal legs 120a come to respective points at the vertical plane, rather than the flat sections as illustrated. Continuing to move away from the vertical plane on each side of the vertical plane, and for each of the two vertical legs 120a, from the position on the horizontal leg at which the length begins to decline (the first position), the length declines over all or part of the remaining portion of the horizontal leg outward of the first position at least until reaching a second position 127 on that portion of the respective side of the respective horizontal leg. For each of the four portions of the two horizontal legs, the length may decline continuously between the two positions or, instead, intermittently, even with intermediate increases in length. Thus, while in the illustrated embodiments, the length decline is continuous between each first/second position pair, it should be understood that this is for purposes of illustration only and that other configurations are encompassed by the present disclosure. Similarly, while in each of the four upper horizontal leg portions illustrated in FIGS. 7 and 8, length declines linearly between the first and second positions, it should also be understood that this is for purposes of example and that other configurations are possible. Still further, while the second position at each of the four portions of the two horizontal legs resides at the far end of each horizontal leg portion, at the connection between the respective horizontal leg portion and one of the longitudinal members 110a of frame 110, it should again be understood that this is for purposes of illustration and that the second position may be inward from frame 110.

Figure 3:
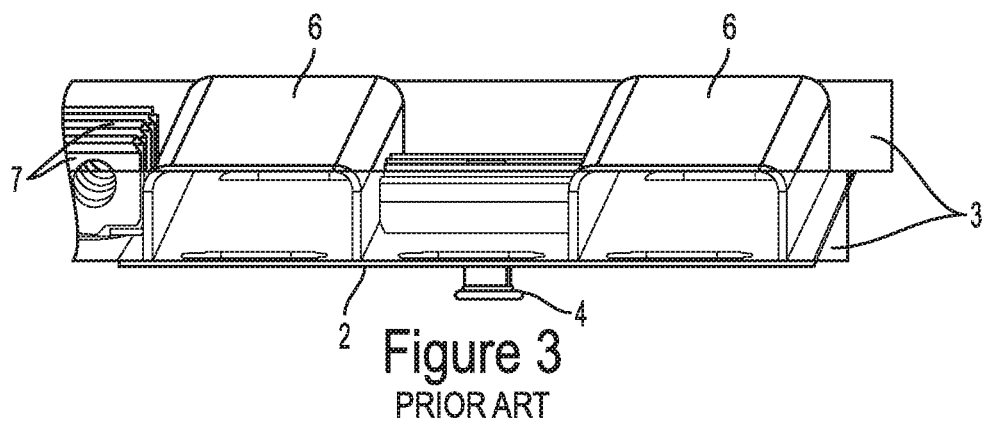
FIG. 3 is a partial perspective view of the upper coupler of FIG. 1, further illustrating cross members of the prior art.

In still further embodiments, cross-members 120 are formed in an upside-down U-shape in cross-section, similar to the configuration of FIG. 3, except that the length of the upper surfaces of the cross-members vary as described above with respect to the length (parallel to the floor's longitudinal axis) of first legs 120a.

Figure 9:
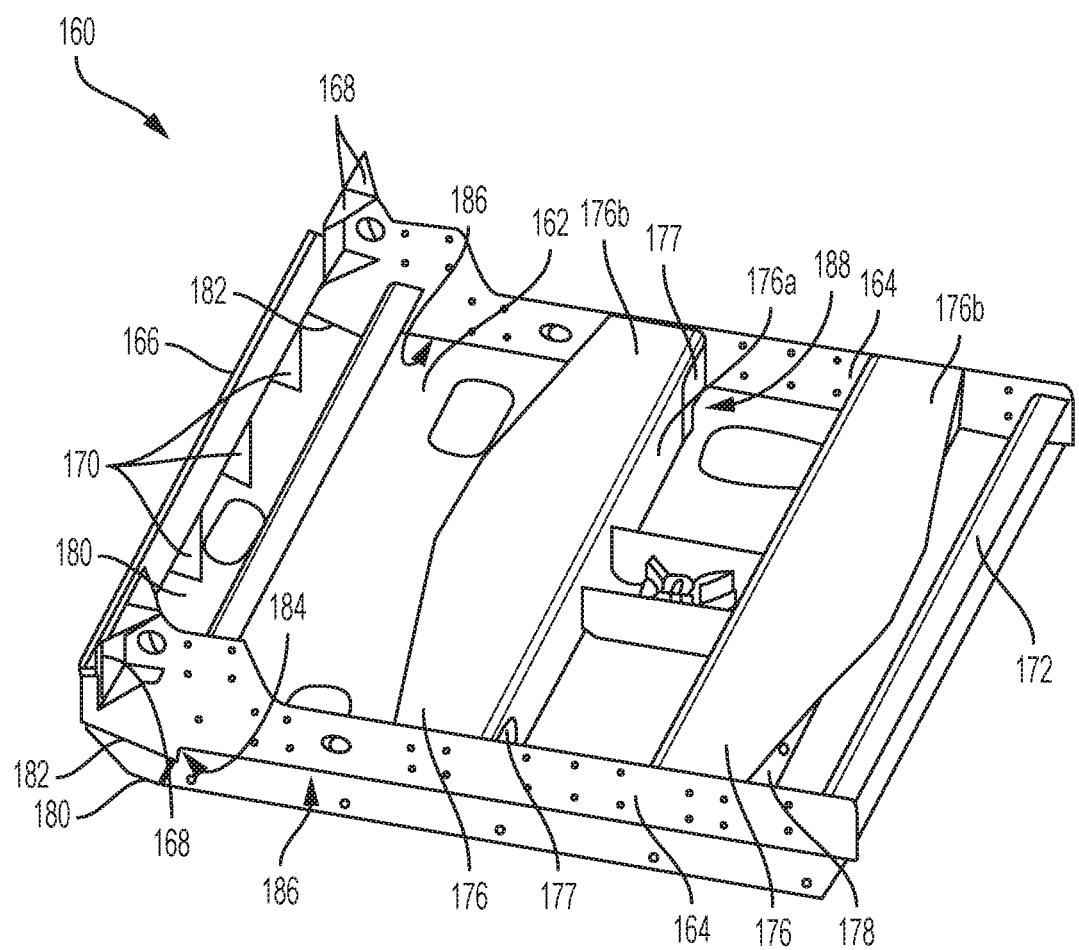
FIG. 9 is a perspective view of an upper coupler according to an example embodiment for use with a platform trailer.

FIG. 9 illustrates an alternative embodiment of an upper coupler 160 for use in a platform trailer, in which upper coupler 160 is received between the trailer's two parallel longitudinal I-beams, or main rails, that support the platform trailer floor. Upper coupler 160 includes a bottom plate 162 that covers an entire bottom area of the upper coupler. A pair of generally planar longitudinal mounting members 164 extend longitudinally and vertically at opposite sides of bottom plate 162, inward of the respective side edges of bottom plate 162 so that the portions of bottom plate 162 that extend transversely outward of the longitudinal members cover the undersides of the two main rails and thereby protect the main rails from contact with the tractor fifth wheel. Longitudinal mounting members 164 are attached to a narrow approach plate 180, e.g. by weldment, at an interface 182 between the two components, but the bottom edge of each of longitudinal members 164 arches upward, at 184, at the leading edge of bottom plate 162, and the bottom edges of longitudinal members 164 thereafter extend parallel to the upper surface of bottom plate 162 to thereby define vertically extending gaps 186 between the bottom plate upper surface and the longitudinal member bottom edges. These gaps are open to the rear of the upper coupler assembly, and four notches 188 are respectively defined by vertical legs 176a immediately below the four positions at which the vertical legs meet longitudinal members 164, so that the upper coupler assembly can slide onto the main rails at their lower horizontal flanges so that the inward portions of the beams' lower horizontal flanges are received in gaps 186, between bottom plate 162 and the bottom edges of longitudinal members 164. Longitudinal members 164, then, are positioned flush against the respective beams' vertical web member, and longitudinal members 164 define a plurality of through holes to receive mounting hardware, e.g., rivets, for attaching the longitudinal members, and thereby the upper coupler, to vertical webs of the main beams. A front frame portion 166 includes longitudinally-extending reinforcement gussets 170 and mounting flanges 168 for attachment to the trailer's lower front rail, which may be assembled onto the trailer after the upper coupler assembly is installed. Front frame portion 166 extends along a front end of bottom plate 162, and a rear channel member 172 extends between and provides support to the rear ends of the longitudinal members 164. A kingpin (the upward end of which is visible in FIG. 9) extends down through a through-hole in bottom plate 162 and is configured similarly to kingpin 104 (FIG. 8) above. A pair of tapered cross members 176 are elongated in the trailer's transverse dimension and have geometry and orientations similar to that of tapered cross members 120 (FIGS. 7 and 8), having C-channel cross sections taken in a plane perpendicular to the trailer's transverse dimension including a first leg 176a extending vertically between a tapered second leg 176b and a third leg (not shown, but below, and extending parallel to, second leg 176b). Horizontal legs 176b are configured with the same geometry as described above with respect to horizontal legs 120a (FIG. 7), except that legs 176b are shorter than legs 120a in the direction perpendicular to the trailer floor's longitudinal axis, due to the upper coupler's shorter width in that direction for use with platform trailers in order to fit between the platform trailer's main beams. Each of cross members 176 is made of approximately 0.127" steel. Cross members 176 attach to longitudinal mounting members 164 and bottom plate 162 by weldment. Similar to the embodiments discussed above with respect to FIGS. 7 and 8, a reinforcing member 177 is welded to each transverse end of vertical leg 176a to thicken the material at the cross members' engagements with longitudinal members 164. Vertical reinforcement members 178 (one partially shown) extend vertically from bottom plate 162 to a respective top vertical leg 176b of transverse cross members 176 and along a width of upper coupler 160 between cross longitudinal members 164. Upper coupler 160 is configured with longitudinal members 164 set inwards from side edges of the upper coupler so that longitudinal members 164 are disposed between structural longitudinal members of the platform trailer. Upper coupler 160 does not have an independent approach plate. Instead, bottom plate 162 extends to a front of upper coupler 160.

Figure 10:
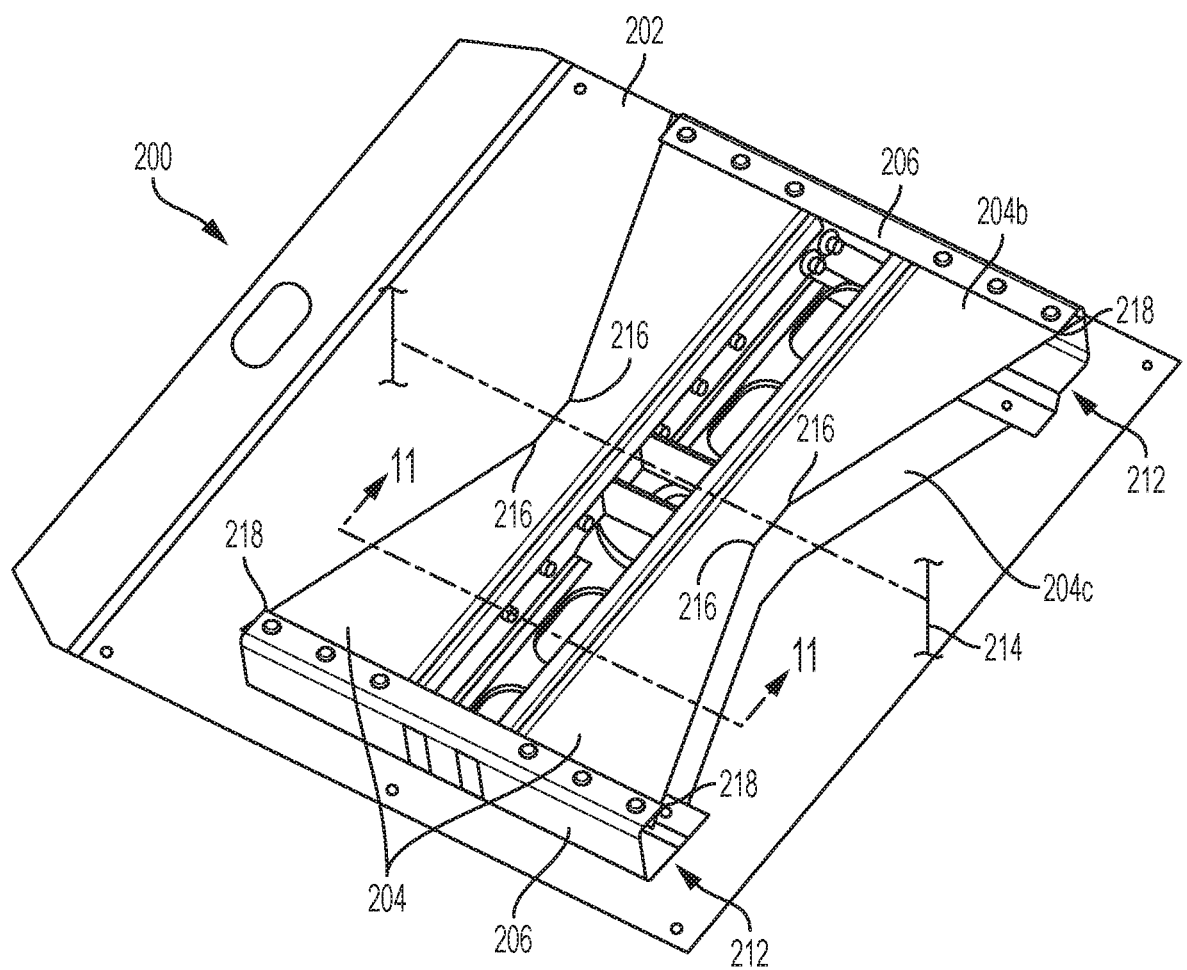
FIG. 10 is a perspective view of an upper coupler according to an example embodiment.
Figure 11:
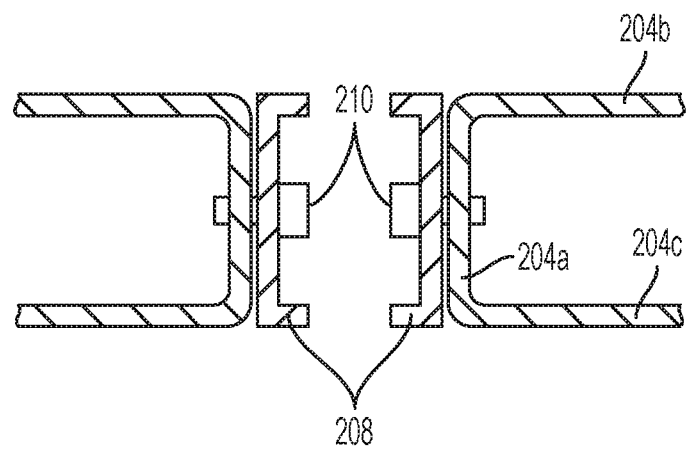
FIG. 11 is a cross-sectional view of the upper coupler of FIG. 10.

In some embodiments, a maximum stress on the transverse cross members is not centered at the transverse cross member's length, but is instead located near the ends of the cross members. This may be due to, for example, the pulling/braking loads transferred through the kingpin or as a result of various loading configurations. In such situations, it may be advantageous to have transverse cross members that are wider at their respective ends and narrower in the middle, along the trailer's transverse dimension, thereby minimizing the weight of the cross members by reducing material in cross sections subject to lower bending moments. FIGS. 10 and 11 illustrate such an embodiment of an upper coupler 200. Referring to FIGS. 10 and 11, upper coupler 200 includes a bottom plate 202 and transverse cross members 204. Transverse cross members 204 have C-shaped cross sections taken in planes perpendicular to the trailer's transverse dimension, each including a vertically-extending first leg 204a, a second leg 204b that extends horizontally from a top of first leg 204a, and a third leg 204c that extends horizontally and parallel to second leg 204b. A front transverse member 204 has its opening of the C-channel facing a front of the trailer, and a rear transverse member 204 has its C-channel opening facing a rear of the trailer. Transverse members 204 attach to bottom plate 202 via a pair of mounting members 206 that extend longitudinally along sides of bottom plate 202. Ends of second legs 204b extend beneath lower surfaces of mounting members 206 and attach via rivets. Ends of third legs 204c extend below lower surfaces of the lowermost flanges of mounting members 206 and attach via rivets both to the mounting member 206 flanges and to bottom plate 202.

Upper coupler 200 is received between the two I-beam main rails beneath the deck of the platform trailer. Respective edges of the bottom horizontal flanges of the two I-beams are received in two slots 212 defined between a lower surface of inward extensions of mounting members 206 and an upper surface of bottom plate 202, so that the vertical portions of mounting members 206 sit flush against the respective vertical webs of the two I-beam main rails. Mounting members 206 may be attached to the I-beam webs by bonding, bolting or riveting, welding, or other suitable means. Vertical leg 204a defines vertical notches on both sides (similar to notches 188 illustrated in FIG. 9) to conform to slots 212 to allow passage of the I-beam horizontal flanges, and bottom leg 204c stops short of gaps 212. Again, bottom plate 202 extends under the undersides of both main beams, thereby protecting the I-beams from contact with the tractor fifth wheel. A pair of shallow channel members 208 welded to the bottom plate extend parallel to, and between, transverse members 204 so that the channel openings of channel members 208 face each other. Surfaces of shallow channel members 208 opposite the channels' openings abut respective first legs 204a of transverse members 204, and aligned respective through-holes in shallow channel members 208 and first legs 204a receive bolts 210 therethrough for fastening the members to the transverse members 204. Channel members 208, in addition to providing a mounting structure for mounting transverse members 204, also provide further rigidity to the upper coupler.

As illustrated in FIG. 10, the smallest dimension of the two horizontal legs 204b, in a direction parallel to the trailer floor's longitudinal axis, is at the vertical plane 214 that includes the trailer floor's longitudinal axis and passes through the kingpin. Moving transversely (e.g. perpendicularly) away from each side of the vertical plane, this dimension, or length, remains constant for a short distance until reaching opposing positions 216 on the horizontal leg at which the length begins to increase. In other embodiments, however, the length begins to immediately increase from the vertical plane, so that the two horizontal legs 204b come to respective inverse points at the vertical plane, rather than the flat sections as illustrated. Continuing to move away from the vertical plane on each side of the vertical plane, and for each of the two vertical legs 204b, from positions 216 on the horizontal leg at which the length begins to increase (the first position), the length increases over all or part of the remaining portion of the horizontal leg outward of the first position at least until reaching a second position 218 on that portion of the respective side of the respective horizontal leg. For each of the four portions of the two horizontal legs, the length may increase continuously between the two positions or, instead, intermittently, even with intermediate decreases in length. Thus, while in the illustrated embodiments, the length increase is continuous between each first/second position pair, it should be understood that this is for purposes of illustration only and that other configurations are encompassed by the present disclosure. Similarly, while in each of the for horizontal leg portions illustrated in FIG. 10, length increases linearly between the first and second positions, it should also be understood that this is for purposes of example and that other configurations are possible. Still further, while the second position at each of the four portions of the two horizontal legs resides at the far end of each horizontal leg portion, at the connection between the respective horizontal leg portion and one of the longitudinal mounting members 206 that comprise a frame, it should again be understood that this is for purposes of illustration and that the second position may be inward from the frame.

Transverse members 204 are tapered so that they are more narrow, and, therefore, the second moment of area is smaller in cross sections taken in planes perpendicular to the transverse dimension, at the trailer's longitudinal centerline than at the edges. In this way, upper coupler 200 is optimized for loading conditions where the bending moments are at maximums near the upper coupler's sides.

While one or more preferred embodiments of the invention are described above, it should be appreciated by those skilled in the art that various modifications and variations can be made in the present invention without departing from the scope and spirit thereof. Accordingly, it should be understood that the elements of one embodiment may be combined with another embodiment to create a still further embodiment. It is intended that the present invention cover such modifications and variations as come within the scope and spirit of the present disclosure, the appended claims, and their equivalents.

What is claimed is:

1. A semi-trailer for use with a tractor, comprising:
a floor having a forward end and a rearward end and being elongated between the forward end and the rearward end, thereby defining a longitudinal dimension extending between the forward end and the rearward end;
wheels attached to the floor at a rearward section of the semi-trailer proximate the rearward end by a suspension; and
an upper coupler assembly attached to the floor at a forward section of the semi-trailer proximate the forward end, the upper coupler assembly having
a generally planar bottom plate having a lower surface that defines an area for contact between the upper coupler assembly and a tractor fifth wheel,
a kingpin attached to the bottom plate and extending downward from the lower surface, and
a first reinforcement member attached to an upper surface of the bottom plate, wherein the first reinforcement member has a second moment of area defined in cross section taken in a plane perpendicular to a first dimension, about a horizontal axis through a centroid of the cross section,
wherein the second moment of area of the first reinforcement member varies over at least part of the first reinforcement member in the first dimension,
wherein the first reinforcement member has at least one continuous portion thereof that is longer in each of the first dimension and a second dimension than in a third dimension, wherein the first dimension is transverse to the longitudinal dimension and generally parallel by the generally planar bottom plate, wherein the second dimension is the longitudinal dimension, wherein the third dimension is transverse to the longitudinal dimension and generally perpendicular to the generally planar bottom plate, and wherein the at least one continuous portion of the first reinforcement member has a length in the second dimension that varies whir the first dimension.

2. The semi-trailer as in claim 1, wherein the length in the second dimension decreases with distance from a center of the at least one continuous portion over at least part of the at least one continuous portion.

3. The semi-trailer as in claim 1, wherein the length in the second dimension increases with distance from a center of the at least one continuous portion over at least part of the at least one continuous portion.

4. The semi-trailer as in claim 1, wherein the length in the second dimension varies linearly over at least part of the at least one continuous portion.

5. A semi-trailer for use with a tractor, comprising:
a floor having a forward end and a rearward end and be in a elongated between the forward end and the rearward end, thereby defining a longitudinal dimension extending between the forward end and the rearward end,
wheels attached to the door at a rearward section of the semi-trailer proximate the rearward end by a suspension; and
an upper coupler assembly attached to the floor at a forward section of the semi-trader proximate the forward end, the upper coupler assembly having
a generally planar bottom plate having a lower surface that defines an area for contact between the upper coupler assembly and a tractor fifth wheel,
a kingpin attached to the bottom plate and extending downward from the lower surface, and
a first reinforcement member attached to an upper surface of the bottom plate that is elongated in a first dimension that is transverse to the longitudinal dimension, wherein the first reinforcement member has a second moment of area defined in cross section taken in a plane perpendicular to the first dimension about a horizontal axis through a centroid of the cross section, and
wherein
the second moment of area of the first reinforcement member varies over at least part of the first reinforcement member in the first dimension,
the first reinforcement member has a first vertical leg that extends upward from the bottom plate and a first horizontal leg that extends from the first vertical leg so that the first horizontal leg is generally parallel to and offset from the bottom plate,
the first horizontal leg has a first length in the longitudinal dimension,
the first length varies over at least a first portion of the first horizontal leg extending from a first side of a vertical plane that includes the longitudinal dimension and the kingpin, between a first position at the first portion of the first horizontal leg and a second position at the first portion of the horizontal leg, and
the second position is further from the vertical plane than the first position.

6. The semi-trailer as in claim 5, wherein the first length is greater at the first position at the first portion of the first horizontal leg than at the second position at the first portion of the first horizontal leg.

7. The semi-trailer as in claim 5, wherein the first length is lesser at the first position at the first portion of the first horizontal leg than at the second position at the first portion of the first horizontal leg.

8. The semi-trailer as in claim 6, wherein the first length varies linearly and entirely between the first position at the first portion of the first horizontal leg and the second position at the first portion of the first horizontal leg.

9. The semi-trailer as in claim 7, wherein the first length varies linearly and entirely between the first position at the first portion of the first horizontal leg and the second position at the first portion of the first horizontal leg.

10. The semi-trailer as in claim 6, wherein the first position is offset from the vertical plane in the transverse dimension.

11. The semi-trailer as in claim 7, wherein the first position is offset from the vertical plane in the transverse dimension.

12. The semi-trailer as in claim 5, wherein
the first length varies over at least a second portion of the first horizontal leg extending from a second side of the vertical plane, between a first position at the second portion of the first horizontal leg and a second position at the second portion of the first horizontal leg, and
the second position at the second portion of the first horizontal leg is further from the vertical plane than the first position at the second portion of the first horizontal leg.

13. The semi-trailer as in claim 12, wherein the first length is greater at the first position at the second portion of the first horizontal leg than at the second position at the second portion of the first horizontal leg.

14. The semi-trailer as in claim 12, wherein the first length is lesser at the first position at the second portion of the first horizontal leg than at the second position at the second portion of the first horizontal leg.

15. The semi-trailer as in claim 5, wherein the first reinforcement member has a second vertical leg that extends between the upper surface of the bottom plate and a bottom surface of the first horizontal leg.

16. The semi-trailer as in claim 5, wherein the first reinforcement member has a lower horizontal leg that extends from the first vertical leg below the first horizontal leg.

17. A semi-trailer for use with a tractor, comprising:
a floor having a forward end and a rearward end and being elongated between the forward end and the rearward end, thereby defining a longitudinal dimension extending between the forward end and the rearward end;
wheels attached to the floor at a rearward section of the semi-trailer proximate the rearward end by a suspension, and
an upper coupler assembly attached to the floor at a forward section or the semi-trailer proximate the forward end, the upper counter assembly having
a generally planar bottom plate having a lower surface that defines an area for contact between the upper coupler assembly and a tractor fifth wheel,
a kingpin attached to the bottom plate and extending downward from the lower surface, and
a first reinforcement member attached to an upper surface of the bottom plate that is elongated in a first dimension that is transverse to the longitudinal dimension, wherein the first reinforcement member has a second moment or area defined in cross section taken in a plane perpendicular to the first dimension about a horizontal axis through a centroid of the cross section, and wherein the second moment of area of the first reinforcement member varies over at least part of the first reinforcement member in the first dimension, the first reinforcement member has a first vertical leg that extends upward from the bottom plate and a first horizontal leg that extends from the first vertical leg so that the first horizontal leg is generally parallel to and offset from the bottom plate, the first horizontal leg has a first length in the longitudinal dimension, the first length varies over at least a first portion of the first horizontal leg extending from a first side of a vertical plane that includes the longitudinal dimension and the kingpin, between a first position at the first portion of the first horizontal leg and a second position at the first portion of the first horizontal leg, the second position at the first portion of the first horizontal leg is further from the vertical plane than the first position at the first portion of the first horizontal leg, the first length varies over at least a second portion of the first horizontal leg extending from a second side of the vertical plane, between a first position at the second portion of the first horizontal leg and a second position at the second portion of the first horizontal leg, and the second position at the second portion of the first horizontal leg is further from the vertical plane than the first position at the second portion of the first horizontal leg.

18. The semi-trailer as in claim 17, wherein the first length is greater at the first position at the first portion of the first horizontal leg than at the second position at the first portion of the first horizontal leg and at the first position at the second portion of the first horizontal leg than at the second position at the second portion of the first horizontal leg.

19. The semi-trailer as in claim 17, wherein the first length is lesser at the first position at the first portion of the first horizontal leg than at the second position at the first portion of the first horizontal leg and at the first position at the second portion of the first horizontal leg than at the second position at the first portion of the first horizontal leg.

20. The semi-trailer as in claim 18, wherein the first length varies linearly and entirely between the first position at the first portion of the first horizontal leg and the second position at the first portion of the first horizontal leg, and the first length varies linearly and entirely between the first position at the second portion of the first horizontal leg and the second position at the second portion of the first horizontal leg.

21. The semi-trailer as in claim 19, wherein the first length varies linearly and entirely between the first position at the first portion of the first horizontal leg and the second position at the first portion of the first horizontal leg, and the first length varies linearly and entirely between the first position at the second portion of the first horizontal leg and the second position at the second portion of the first horizontal leg.

22. The semi-trailer as in claim 20, wherein the first position at the first portion of the first horizontal leg is offset from the vertical plane in the transverse dimension, the first position at the second portion of the first horizontal leg is offset from the vertical plane in the transverse dimension, and the first length does not vary between the first position at the first portion of the first horizontal leg and the first position at the second portion of the first horizontal leg.

23. The semi-trailer as in claim 21, wherein the first position at the first portion of the first horizontal leg is offset from the vertical plane in the transverse dimension, the first position at the second portion of the first horizontal leg is offset from the vertical plane in the transverse dimension, and the first length does not vary between the first position at the first portion of the first horizontal leg and the first position at the second portion of the first horizontal leg.

24. A semi-trailer for use with a tractor, comprising:

a floor having a forward end and a rearward end and being elongated between the forward end and the rearward end, thereby defining a longitudinal dimension extending between the forward end and the rearward end;

wheels attached to the floor at a rearward section of the semi-trailer proximate the rearward end by a suspension; and an upper coupler assembly attached to the floor si a forward section of the semi-trailer proximate the forward end, the upper coupler assembly having a generally planar bottom plate having a lower surface that defines an area for contact between the ripper coupler assembly and a tractor fifth wheel, a kingpin attached to the bottom plate and extending downward from the lower surface, and a first reinforcement member attached to an upper surface of the bottom plate that is elongated in a dimension that is transverse to the longitudinal dimension, wherein the first reinforcement member has a second moment of area defined in cross section taken in a plane perpendicular to the first dimension about a horizontal axis through a centroid of the cross section, and wherein the second moment of area of the first reinforcement member varies over at least part of the first reinforcement member in the first dimension, the upper coupler assembly has a second reinforcement member attached to the upper surface of the bottom plate that is elongated in the first dimension and that is offset from the first reinforcement member in the longitudinal dimension, the second reinforcement member has a second moment of area defined in cross section taken in a plane perpendicular to the first dimension about a horizontal axis through a centroid of the second reinforcement member cross section, and the second moment of area of the second reinforcement member varies over at least part of the second reinforcement member in the first dimension.

25. The semi-trailer as in claim 24, wherein
the first reinforcement member has a first vertical leg that extends upward from the bottom plate and a first horizontal leg that extends from the first vertical leg so that the first horizontal leg is generally parallel to and offset from the bottom plate,
the first horizontal leg has a first length in the longitudinal dimension,
the first length varies over at least a first portion of the first horizontal leg extending from a first side of a vertical plane that includes the longitudinal dimension and the kingpin, between a first position at the first portion of the first horizontal leg and a second position at the first portion of the first horizontal leg,
the second reinforcement member has a second vertical leg that extends upward from the bottom plate and a second horizontal leg that extends from the second vertical leg so that the second horizontal leg is generally parallel to and offset from the bottom plate,
the second horizontal leg has a second length in the longitudinal dimension, and
the second length varies over at least a first portion of the second horizontal leg extending from the first side of the vertical plane, between a first position at the first portion of the second horizontal leg and a second position at the first portion of the second horizontal leg.

26. The semi-trailer as in claim 17, wherein
the upper coupler assembly has a second reinforcement member attached to the upper surface of the bottom plate that is elongated in the first dimension and that is offset from the first reinforcement member in the longitudinal dimension,
the second reinforcement member has a second moment of area defined in cross section taken in a plane perpendicular to the first dimension about a horizontal axis through a centroid of the second reinforcement member cross section,
the second moment of area of the second reinforcement member varies over at least part of the second reinforcement member in the first dimension,
the second reinforcement member has a second vertical leg that extends upward from the bottom plate and a second horizontal leg that extends from the second vertical leg so that the second horizontal leg is generally parallel to and offset from the bottom plate,
the second horizontal leg has a second length in the longitudinal dimension,
the second length varies over at least a first portion of the second horizontal leg extending from the first side of the vertical plane, between a first position at the first portion of the second horizontal leg and a second position at the first portion of the second horizontal leg,
the second position at the first portion of the second horizontal leg is further from the vertical plane than the first position at the first portion of the second horizontal leg,
the second length varies over at least a second portion of the second horizontal leg extending from the second side of the vertical plane, between a first position at the second portion of the second horizontal leg and a second position at the second portion of the second horizontal leg, and
the second position at the second portion of the second horizontal leg is further from the vertical plane than the first position at the second portion of the second horizontal leg.

27. The semi-trailer as in claim 26, wherein
the first length is greater
at the first position at the first portion of the first horizontal leg than at the second position at the first portion of the first horizontal leg and
at the first position at the second portion of the first horizontal leg than at the second position at the first portion of the first horizontal leg, and
the second length is greater
at the first position at the first portion of the second horizontal leg than at the second position at the first portion of the second horizontal leg and
at the first position at the second portion of the second horizontal leg than at the second position at the second portion of the second horizontal leg.

28. The semi-trailer as in claim 26, wherein
the first length is lesser
at the first position at the first portion of the first horizontal leg than at the second position at the first portion of the first horizontal leg and
at the first position at the second portion of the first horizontal leg than at the second position at the first portion of the first horizontal leg, and
the second length is lesser
at the first position at the first portion of the second horizontal leg than at the second position at the first portion of the second horizontal leg and
at the first position at the second portion of the second horizontal leg than at the second position at the second portion of the second horizontal leg.

29. The semi-trailer as in claim 27, wherein
the first length varies linearly and entirely between the first position at the first portion of the first horizontal leg and the second position at the first portion of the first horizontal leg,
the first length varies linearly and entirely between the first position at the second portion of the first horizontal leg and the second position at the second portion of the first horizontal leg,
the second length varies linearly and entirely between the first position at the first portion of the second horizontal leg and the second position at the first portion of the second horizontal leg, and
the second length varies linearly and entirely between the first position at the second portion of the second horizontal leg and the second position at the second portion of the second horizontal leg.

30. The semi-trailer as in claim 28, wherein
the first length varies linearly and entirely between the first position at the first portion of the first horizontal leg and the second position at the first portion of the first horizontal leg, and
the first length varies linearly and entirely between the first position at the second portion of the first horizontal leg and the second position at the second portion of the first horizontal leg.

31. The semi-trailer as in claim 29, wherein
the first position at the first portion of the first horizontal leg is offset from the vertical plane in the transverse dimension,
the first position at the second portion of the first horizontal leg is offset from the vertical plane in the transverse dimension,
the first length does not vary between the first position at the first portion of the first horizontal leg and the first position at the second portion of the first horizontal leg, the first position at the first portion of the second horizontal leg is offset from the vertical plane in the transverse dimension,
the first position at the second portion of the second horizontal leg is offset from the vertical plane in the transverse dimension, and
the second length does not vary between the first position at the first portion of the second horizontal leg and the first position at the second portion of the second horizontal leg.

32. The semi-trailer as in claim 30, wherein
the first position at the first portion of the first horizontal leg is offset from the vertical plane in the transverse dimension,
the first position at the second portion of the first horizontal leg is offset from the vertical plane in the transverse dimension,
the first length does not vary between the first position at the first portion of the first horizontal leg and the first position at the second portion of the first horizontal leg,
the first position at the first portion of the second horizontal leg is offset from the vertical plane in the transverse dimension,
the first position at the second portion of the second horizontal leg is offset from the vertical plane in the transverse dimension, and
the first length does not vary between the first position at the first portion of the second horizontal leg and the first position at the second portion of the second horizontal leg.

33. A semi-trailer for use with a tractor, comprising:
a floor having a forward end and a rearward end and being elongated between the forward end and the rearward end, thereby defining a longitudinal dimension extending between the forward end and the rearward end;
wheels attached to the floor at a rearward section of the semi-trailer proximate the rearward end by a suspension; and
an upper coupler assembly attached to the floor at a forward section of the semi-trailer proximate the forward end, the upper coupler assembly having
a generally planar bottom plate having a lower surface that defines an area for contact between the upper coupler assembly and a tractor fifth wheel,
a kingpin attached to the bottom plate and extending downward from the lower surface, and
a first reinforcement member attached to an upper surface of the bottom plate, the first reinforcement member having at least one continuous portion thereof that is longer in each of a first dimension and a second dimension than in a third dimension,
wherein the first dimension is generally parallel to the planar bottom plate,
wherein the second dimension is the longitudinal dimension,
wherein the third dimension transverse to the longitudinal dimension and generally perpendicular to the generally planar bottom plate, and
wherein the least one continuous portion has a length in the longitudinal dimension that varies in the first dimension over at least a portion of the first reinforcement member.

34. The semi-trailer as in claim 33, wherein the length in the longitudinal dimension decreases with distance from a center of the at least one continuous portion over at least part of the at least one continuous portion.

35. The semi-trailer as in claim 33, wherein the length in the longitudinal dimension increases with distance from a center of the at least one continuous portion over at least part of the at least one continuous portion.

36. The semi-trailer as in claim 33, wherein the length in the longitudinal dimension varies linearly over at least part of the at least one continuous portion.

37. A semi-trailer for use with a tractor, comprising:
a floor having a forward end and a rearward end and being elongated between the forward end and the rearward end, thereby defining a longitudinal dimension extending between the forward end and the rearward end;
wheels attached to the floor at a rearward section of the semi-trailer proximate the rearward end by a suspension; and
an upper coupler assembly attached to the floor at a forward section of the semi-trailer proximate the forward end, the upper coupler assembly having
a generally planar bottom plate having a tower surface that defines an area for contact between the upper coupler assembly and a tractor filth wheel,
a kingpin attached to the bottom plate and extending downward from the lower surface, and
a first reinforcement, member attached to an upper and surface of the bottom plate that is elongated in a first dimension that is transverse to the longitudinal dimension,
wherein
the first reinforcement member has a length in the longitudinal dimension that varies in the first dimension over at least a portion of the first reinforcement member,
the first reinforcement member has a first vertical leg that extends upward from the bottom plate and a first horizontal leg that extends from the first vertical leg so that the first horizontal leg is generally parallel to and offset from the bottom plate, and
the first horizontal leg defines the length.

38. An upper coupler assembly disposed within a semi-trailer for use with a tractor, where the semi-trailer has a floor having a forward end and a rearward end and being elongated between the forward end and the rearward end, thereby defining a longitudinal dimension extending between the forward end and the rearward end, and wheels attached to the floor at a rearward section of the semi-trailer proximate the rearward end by a suspension, the upper coupler assembly being attached to the floor at a forward section of the semi-trailer proximate the forward end, the upper coupler assembly comprising:
a generally planar bottom plate having a lower surface that defines an area for contact between the upper coupler assembly and a tractor fifth wheel;
a kingpin attached to the bottom plate and extending downward from the lower surface; and
a first reinforcement member attached to an upper surface of the bottom plate,
wherein the first reinforcement member has a second moment of area defined in cross section taken in a plane perpendicular to a first dimension, about a horizontal axis through a centroid of the cross section,
wherein the second moment of area of the first reinforcement member varies over at least part of the first reinforcement member in the first dimension,
wherein the first reinforcement member has at least one continuous portion thereof that is longer in each of the first dimension and a second dimension than in a third dimension, wherein the first dimension is transverse to the longitudinal dimension and generally parallel to the generally planar bottom plate, wherein the second dimension is in the longitudinal dimension, wherein the third dimension is transverse to the longitudinal dimension and generally perpendicular to the generally planar bottom plate, and wherein the at least one continuous portion of the first reinforcement member has a length in the second dimension that varies with the first dimension.

39. The upper coupler assembly as in claim 38, wherein the length in the second dimension decreases with distance from a center of the at least one continuous portion over at least part of the at least one continuous portion.

40. The upper coupler assembly as in claim 38, wherein the length in the second dimension increases with distance from a center of the at least one continuous portion over at least part of the at least one continuous portion.

41. The upper coupler assembly as in claim 38, wherein the length in the second dimension varies linearly over at least part of the at least one continuous portion.

* * * * *

UNITED STATES PATENT AND TRADEMARK OFFICE
CERTIFICATE OF CORRECTION

PATENT NO. : 10,960,943 B2
APPLICATION NO. : 15/821598
DATED : March 30, 2021
INVENTOR(S) : John M. Jones It is certified that error appears in the above-identified patent and that said Letters Patent is hereby corrected as shown below:

In the Claims

In Claim 1, Column 13, Line 11, please delete the word "whir" and replace with --with--.

In Claim 5, Column 13, Line 25, please delete the phrase "be in a" and replace with --being--.

In Claim 5, Column 13, Line 34, please delete the word "semi-trader" and replace with --semi-trailer--.

In Claim 17, Column 14, Line 59, please delete the word "counter" and replace with --coupler--.

In Claim 24, Column 16, Line 35, please delete the word "si" and replace with --at--.

In Claim 24, Column 16, Line 39, please delete the word "ripper" and replace with --upper--.

In Claim 24, Column 16, Line 45, please insert the word --first-- before the word "dimension".

In Claim 37, Column 20, Line 20, please delete the word "tower" and replace with --lower--.

In Claim 37, Column 20, Line 22, please delete the word "filth" and replace with --fifth--.

Signed and Sealed this
Seventh Day of May, 2024

*Katherine Kelly Vidal*
*Director of the United States Patent and Trademark Office*